United States Patent [19]

Wolfrüm et al.

[11] 4,041,024
[45] Aug. 9, 1977

[54] SULFO CONTAINING MONOAZO DYESTUFFS CONTAINING A BENZTHIAZOLE DIAZO MOIETY AND AN N-BENZYLAMINO ANILINO COUPLING COMPONENT

[75] Inventors: Gerhard Wolfrüm, Opladen; Hans-Günter Otten, Cologne, both of Germany

[73] Assignee: Bayer Aktiengesellschaft, Leverkusen, Germany

[21] Appl. No.: 294,526

[22] Filed: Oct. 3, 1972

Related U.S. Application Data

[63] Continuation of Ser. No. 33,516, April 30, 1970, abandoned.

[51] Int. Cl.² .................. C09B 35/06; C09B 35/22; D06P 1/06; D06P 3/24
[52] U.S. Cl. ........................... 260/158; 260/305; 260/508; 260/509; 260/510
[58] Field of Search .................................... 260/158

[56] References Cited

U.S. PATENT DOCUMENTS

| | | | |
|---|---|---|---|
| 2,889,315 | 6/1959 | Bossard et al. | 260/158 X |
| 3,483,180 | 12/1960 | Ramanathan | 260/158 |
| 3,573,273 | 3/1971 | Seedfelder et al. | 260/158 |
| 3,640,996 | 2/1972 | Sturm et al. | 260/207.1 |
| 3,642,767 | 2/1972 | Hahn et al. | 260/158 |
| 3,660,374 | 5/1972 | Weaver et al. | 260/207 |

*Primary Examiner*—Floyd D. Higel
*Attorney, Agent, or Firm*—Plumley and Tyner

[57] ABSTRACT

Azo dyestuffs of formula

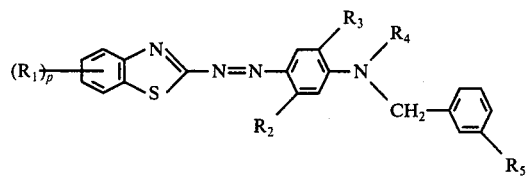

wherein
$R_1$ denotes hydrogen, $C_1$—$C_4$ alkyl, Cl, Br, —$OCH_3$, —$OC_2H_5$, —$NO_2$, —CN, —SCN, —$SO_2CH_3$, —$SO_2C_2H_5$, —$SO_3H$, —$SO_2NX_2$ (X=H or $C_mH_{2m+1}$ with m = 1-4) or —$COOC_nH_{2n+1}$ (n = 0-4);
$R_2$ represents hydrogen, $CH_3$, $C_2H_5$, —$OCH_3$, —$OC_2H_5$, Cl, Br, or the grouping —NH-$COC_nH_{2n+1}$ (n = 0-4);
$R_3$ denotes hydrogen, $OCH_3$, $OC_2H_5$, $CH_3$ or $C_2H_5$;
$R_4$ represents $C_nH_{2n+1}$ (n = 0-4), or $CH_2CH_2SO_3H$;
$R_5$ represents hydrogen or a sulphonic acid group, and p is 1 or 2, with only one of the residues $R_1$, $R_4$ and $R_5$ representing or containing a sulphonic acid group. The dyestuffs are suitable for dyeing nitrogen-containing materials especially for dyeing synthetic polyamide and polyurethane fibers. The dyestuffs are very well absorbed on the polyamide fibers both from an acid dyebath and from a neutral dyebath. In one example synthetic polyamide fibers are dyed in clear shades having good to very good fastness properties.

1 Claim, No Drawings

SULFO CONTAINING MONOAZO DYESTUFFS CONTAINING A BENZTHIAZOLE DIAZO MOIETY AND AN N-BENZYLAMINO ANILINO COUPLING COMPONENT

This is a continuation of application, Ser. No. 33,516 filed Apr. 30, 1970 and now abandoned.

The subject of the invention is new monoazo dyestuffs containing sulphonic acid groups, of formula (I)

as well as processes for their manufacture and their use for dyeing nitrogen-containing fibre materials.

In formula (I), $R_1$ denotes hydrogen, $C_1$-$C_4$ alkyl, Cl, Br, —OCH$_3$, —OC$_2$H$_5$, —NO$_2$, —CN, —SCN, —SO$_2$CH$_3$, —SO$_2$C$_2$H$_5$, —SO$_3$H, —SO$_2$NX$_2$ (X = H or $C_mH_{2m+1}$ with m = 1–4) or —COOC$_n$H$_{2n+1}$ (n = 0–4);

$R_2$ represents hydrogen, CH$_3$, C$_2$H$_5$, —OCH$_3$, —OC$_2$H$_5$, Cl, Br or the grouping —NHCOC$_n$H$_{2n+1}$ (n = 0–4);

$R_3$ denotes hydrogen, OCH$_3$, OC$_2$H$_5$, CH$_3$ or C$_2$H$_5$;

$R_4$ represents $C_nH_{2n+1}$ (n = 0–4), CH$_2$CH$_2$CN, CH$_2$CH$_2$OH or CH$_2$CH$_2$SO$_3$H;

$R_5$ represents hydrogen or a sulphonic acid group, and p is 1 or 2.

with only one of the residues $R_1$, $R_4$ and $R_5$ representing or containing a sulphonic acid group.

The substituent $R_1$ can be located in the 4-, 5-, 6- or 7-position of the benzthiazole ring. According to the definition, the new dyestuffs (I) only contain one sulphonic acid group in the molecule. Thus either $R_1$ or $R_5$ can represent SO$_3$H, or (only) $R_4$ contains a sulphonic acid group.

The dyestuffs of formula (I) are manufactured by diazotising amines of formula (II)

wherein $R_1$ and p possess the abovementioned significance, combining the product with compounds of formula (III)

wherein $R_2$, $R_3$, $R_4$ and $R_5$ have the abovementioned significance, and in each case so choosing the amines of formula (II) and coupling components of formula (III) that only one sulphonic acid group is contained in the finished dyestuff (I).

Diazo components of formula (II) are, for example: 2-amino-(1,3)-benzthiazole, 4-chlor-2-amino-(1,3)-benzthiazole, 5-chlor-2-amino-(1,3)-benzthiazole, 6-chlor-2-amino-(1,3)-benthiazole, 7-chlor-2-amino-(1,3)-benzthiazole, 4-brom-2-amino-(1,3)-benzthiazole, 5-brom-2-amino-(1,3)-benzthiazole, 6-brom-2-amino-(1,3)-benzthiazole, 4,6-dichlor-2-amino-(1,3)-benzthiazole, 4,7-dichlor-2-amino-(1,3)-benzthiazole, 4,6-dibrom-2-amino-(1,3)-benzthiazole, 4-methyl-2-amino-(1,3)-benzthiazole, 6-methyl-2-amino-(1,3)-benzthiazole, 4,7-dimethyl-2-amino-(1,3)-benzthiazole, 6-ethyl-2-amino-(1,3)-benzthiazole, 4-methoxy-2-amino-(1,3)-benzthiazole, 4-ethoxy-2-amino-(1,3)-benzthiazole, 6-methoxy-2-amino-(1,3)-benzthiazole, 6-ethoxy-2-amino-(1,3)-benzthiazole, 6-nitro-2-amino-(1,3)-benzthiazole, 6-cyan-2-amino-(1,3)-benzthiazole, 6-thiocyanato-2-amino-(1,3)-benzthiazole, 6-methylsulphonyl-2-amino-(1,3)-benzthiazole, 6-ethylsulphonyl-2-amino-(1,3)-benzthiazole, 2-amino-(1,3)-benzthiazole-(6)-sulphonic acid, 2-amino-(1,3)-benzthiazole-(6)-sulphonic acid amide, 2-amino-(1,3)-benzthiazole-(6)-sulphonic acid dimethylamide, 2-amino-(1,3)-benzthiazole-(6)-sulphonic acid diethylamide, 2-amino-(1,3)-benzthiazole-(6)-sulphonic acid dibutylamide, 2-amino-(1,3)-benzthiazole-(6)-carboxylic acid, 2-amino-(1,3)-benzthiazole-(6)-carboxylic acid methyl ester, 2-amino-(1,3)-benzthiazole-(6)-carboxylic acid ethyl ester, and 2-amino-(1,3)-benzthiazole-(6)-carboxylic acid butyl ester.

Coupling components of formula (III) are, for example: N-ethyl-N-benzyl-aniline, 3-(N-ethyl-N-benzylamino)-toluene, N-methyl-N-benzyl-aniline, 3-(N-methyl-N-benzylamino)-toluene, N-butyl-N-benzyl-aniline, 3-(N-butyl-N-benzyl-amino)-toluene, 3-(N-ethyl-N-benzyl-amino)-chlorobenzene, 3-(N-ethyl-N-benzylamino)-bromobenzene, 3-(N-ethyl-N-benzyl-amino)-acetanilide, 3-(N-ethyl-N-benzylamino)-propionic acid anilide, 3-(N-ethyl-N-benzylamino)-anisole, 3-(N-ethyl-N-benzylamino)-ethoxybenzene, 3-(N-butyl-N-benzylamino)-methoxybenzene, 2-(N-benzyl-amino)-toluene, 2-(N-benzyl-amino)-anisole, 4-methyl-2-(N-ethyl-N-benzyl-amino)-anisole, 4-methyl-2-(N-methyl-N-benzyl-amino)-anisole, 4-methyl-2-(N-butyl-N-benzyl-amino)-anisole, 4-methyl-2-(N-methyl-N-benzylamino)-ethoxybenzene, 4-methyl-2-(N-ethyl-N-benzyl-amino)-ethoxybenzene, 4-methyl-2-(N-butyl-N-benzyl-amino)-ethoxybenzene, 4-acetylamino-2-(N-methyl-N-benzyl-amino)-anisole, 4-acetylamino-2-(N-ethyl-N-benzylamino)-anisole, 4-acetylamino-2-(N-butyl-N-benzylamino)-anisole, 4-acetyl-amino-2-(N-ethyl-N-benzyl-amino)-ethoxybenzene, 4-formyl-amino-2-(N-ethyl-N-benzylamino)-anisole, 4-formylamino-2-(N-ethyl-N-benzylamino)-ethoxybenzene, 2-(N-methyl-N-benzylamino)-1,4-dimethoxybenzene, 2-(N-ethyl-N-benzylamino-)1,4-dimethoxybenzene, 2-(N-butyl-N-benzyl-amino)-1,4-dimethoxy-benzene, 2-(N-ethyl-N-benzyl-amino)-1,4-diethoxy-benzene, 3-(N-β-cyanethyl-N-benzyl-amino)-toluene, 3-(N-β-hydroxyethyl-N-benzyl-amino)-toluene, 3-(N-β-cyanethyl-N-benzyl-amino)-anisole, 3-(N-β-hydroxyethyl-N-benzylamino)-anisole, 3-[N-(3-sulphobenzyl)-amino]-toluene, 3-[N-methyl-N-(3-sulphobenzyl)-amino]-toluene, 3-[N-ethyl-N-(3-sulphobenzyl)-amino]-toluene, 3-[N-butyl-N-(3-sulphobenzyl)-amino]-toluene, 3-(N-methyl-N-(3-sulphobenzyl)-amino]-chlorobenzene, 3-[N-ethyl-N-(3-sulphobenzyl)-amino]-chlorobenzene, 3-[N-butyl-N-(3-sulphobenzyl)-amino]-chlorobenzene, 3-[N-ethyl-N-(3-sulphobenzyl)-amino]-bromobenzene, 3-[N-methyl-N-(3-sulphobenzyl)-amino]-acetanilide, 3-[N-ethyl-N-(3-sulphobenzyl)-amino]-acetanilide, 3-[N-butyl-N-(3-sulphobenzyl)-amino]-acetanilide, 3-[N-ethyl-N-(3-sulphobenzyl)-amino]-formanilide, 3-[N-ethyl-N-(3-sulphobenzyl)-amino]-propionic acid anilide, 3-[N-methyl-N-(3-sulphobenzyl)-amino]-anisole, 3-[N-ethyl-N-(3-sulphobenzyl)-amino]-anisole, 3-[N-butyl-N-($\beta$-sulphobenzyl)-amino]-anisole, 3-[N-ethyl-N-(3-sulphobenzyl)-amino]-ethoxybenzene, 2-[N-(3-sulphobenzyl)-amino]-toluene, 2-[N-(3-sulphobenzyl)-amino]-anisole, 4-methyl-2-[N-methyl-N-(3-sulphobenzyl)-amino]-anisole, 4-methyl-2-[N-ethyl-N-(3-sulphobenzyl)-amino]-anisole, 4-methyl-2-[N-butyl-N-(3-sulphobenzyl)-amino]-anisole, 4-methyl-2-[N-methyl-N-(3-sulphobenzyl)-amino]-ethoxybenzene, 4-methyl-2-[N-ethyl-N-(3-sulphobenzyl)-amino]-ethoxybenzene, 4-acetylamino-2-[N-methyl-N-(3-sulphobenzyl)-amino]-anisole, 4-acetylamino-2-[N-ethyl-N-(3-sulphobenzyl)-amino]-anisole, 4-acetylamino-2-[N-butyl-N-(3-sulphobenzyl)-amino]-anisole, 4-acetylamino-2-[N-ethyl-(3-sulphobenzyl)-amino]-ethoxybenzene, 4-formylamino-2-[N-ethyl-N-(3-sulphobenzyl)-amino]-anisole, 4-propionylamino-2-[N-ethyl-N-(3-sulphobenzyl)-amino]-anisole, 2-[N-methyl-N-(3-sulphobenzyl)-amino]-1,4-dimethoxybenzene, 2-[N-ethyl-N-(3-sulphobenzyl)-amino]-1,4-dimethoxybenzene, 2-[N-butyl-N-(3-sulphobenzyl)-amino]-1,4-dimethoxybenzene, 2-[N-ethyl-N-(3-sulphobenzyl)-amino]-1,4-diethoxybenzene, 3-[N-benzyl-N-($\beta$-sulphoethyl)-amino]-toluene, 3-[N-benzyl-N-($\beta$-sulphoethyl)-amino]-ethylbenzene, 3-[N-benzyl-N-($\beta$-sulphoethyl)-amino]-chlorobenzene, 3-[N-benzyl-N-($\beta$-sulphoethyl)-amino]-bromobenzene, 3-[N-benzyl-N-($\beta$-sulphoethyl)-amino]-anisole, 3-[N-benzyl-N-($\beta$-sulphoethyl)-amino]-ethoxybenzene, 3-[N-benzyl-N-($\beta$-sulphoethyl)-amino]-formanilide, 3-[N-benzyl-N-($\beta$-sulphoethyl)-amino]-acetanilide, 3-[N-benzyl-N-($\beta$-sulphoethyl)-amino]-propionic acid anilide, 4-acetylamino-2-[N-benzyl-N-($\beta$-sulphoethyl)-amino]-toluene, 4-acetylamino-2-[N-benzyl-N-($\beta$-sulphoethyl)-amino]-anisole, 4-acetylamino-2-[N-benzyl-N-($\beta$-sulphoethyl)-amino]-ethoxybenzene, 4-formylamino-2-[N-benzyl-N-($\beta$-sulphoethyl)-amino]-anisole, 4-propionylamino-2-[N-benzyl-N-($\beta$-sulphoethyl)-amino]-anisole, 2-[N-benzyl-N-($\beta$-sulphoethyl)-amino]-1,4-dimethoxybenzene, and 2[N-benzyl-N-($\beta$-sulphoethyl)-amino]-1,4-diethoxybenzene.

The diazo components of formula (II) are diazotised in a known manner in concentrated sulphuric acid or in concentrated phosphoric acid or in a glacial acetic acid/propionic acid mixture by means of nitrosylsulphuric acid, and combined with the coupling components of formula (III) to give the dyestuffs of formula (I). The coupling reaction is carried out in aqueous solution in a neutral or acid medium. The choice of the diazo components of formula (II) and of the coupling components of formula (III) is always made in such a way that the resulting dyestuff of formula (I) only contains a single sulphonic acid group in the molecule. The dyestuffs of formula(I) are sparingly soluble in water in the cold and if the medium is acid, and can therefore be isolated in a simple manner by filtration. The dyestuffs of formula (I) however form very easily water-soluble sodium salts and can therefore easily be purified by recrystallisation. The sparingly water-soluble dyestuffs of formula (I) isolated under acid conditions can be rendered easily water-soluble by mixing them with suitable salts of strong bases and weak acids, for example sodium tetraborate, sodium carbonate, sodium hydrogen phosphate or tertiary sodium phosphate.

The dyestuffs of formula (I) are suitable for dyeing nitrogen-containing materials such as wool and silk, but preferably for dyeing synthetic polyamide and polyurethane fibres in clear color shades having very good wet fastness properties and good to very good light fastness properties. The dyestuffs are very well absorbed on the polyamide fibres both from an acid dyebath and from a neutral dyebath.

In the examples which follow, parts denote parts by weight:

EXAMPLE 1

150 parts of 2-amino-(1,3)-benzthiazole are introduced into 1000 parts of 85% strength orthophosphoric acid whilst stirring, and are subsequently diazotised by dropwise addition of 304 parts of 41.8% strength nitrosylsulphuric acid over the course of about 1 hour at 0°–3° C. The diazotisation is completed by stirring for a further 3 hours at 0°–3° C. Thereafter 10 parts of urea are added and the mixture is stirred for a further 30 minutes in order to destroy excess nitrosylsulphuric acid. The diazonium salt solution manufactured in this way is added, whilst stirring, to a mixture of 2000 parts of water, 3000 parts of ice and 310 parts of 3-[N-acetyl-N-(3'-sulphobenzyl)-amino]-toluene. The coupling starts immediately and goes to completion in the medium which is acid to Congo Red. After about 5 hours' stirring the resulting dyestuff suspension is heated to 70° C over the course of 2 hours and stirred at 70° for 2 hours. The dyestuff, which is now in a coarse crystalline form, is suctionfiltered and washed about 3 times on the filter with 2% strength sodium chloride solution. The wash water then has a pH-value of about 3–4. The dyestuff, of which about 465 parts are obtained after drying, has the constitution

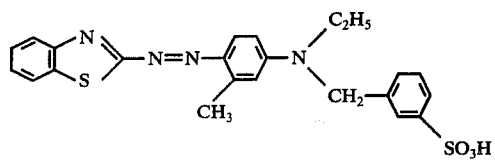

The dyestuff forms an easily water-soluble sodium salt in the pH range of 4–10. It dyes synthetic polyamide fibres or fabrics both from a neutral dyebath and also from a weakly acid dyebath in clear red shades having good to very good fastness properties.

Further valuable dyestuffs are obtained if the diazo components and coupling components listed in the table below are combined with one another in the manner indicated in Example 1. The dyestuffs dye polyamide in the shades indicated.

| Diazo Component | Coupling Component | Shade |
| --- | --- | --- |
| 4-Chlor-2-amino-(1,3)-benzthiazole | 3-[N-Ethyl-N-(3'-sulphobenzyl)-amino]-toluene | bluish-tinged red |
| 5-Chlor-2-amino-(1,3)-benzthiazole | " | " |
| 6-Chlor-2-amino-(1,3)-benzthiazole | " | " |
| 6-Brom-2-amino-(1,3)-benzthiazole | " | " |

-continued

| Diazo Component | Coupling Component | Shade |
| --- | --- | --- |
| 4,6-Dichloro-2-amino-(1,3)-benzthiazole | " | " |
| 4-Methyl-2-amino-(1,3)-benzthiazole | " | " |
| 6-Methyl-2-amino-(1,3)-benzthiazole) | " | " |
| 6-Ethyl-2-amino-(1,3)-benzthiazole | " | " |
| 6-Butyl-2-amino-(1,3)-benzthiazole | " | " |
| 4,6-Dimethyl-2-amino-(1,3)-benthiazole | " | " |
| 6-Methoxy-2-amino-(1,3)-benzthiazole | " | " |
| 6-Ethoxy-2-amino-(1,3)-benzthiazole | " | " |
| 6-Thiocyanato-2-amino-(1,3)-benthiazole | " | strongly bluish-tinged red |
| 6-Methylsulphonyl-2-amino-(1,3)-benzthiazole | " | bluish-tinged red |
| Benzosulphonyl-2-amino-(1,3)-benzthiazole | " | " |
| 2-Amino-(1,3)-benzthiazole-(6)-sulphonic acid dimethylamide | " | ruby |
| 2-Amino-(1,3)-benzthiazole(6)-carboxylic acid ethyl ester | " | " |
| 2-Amino-(1,3)-benzthiazole-(6)-carboxylic acid β-methoxy-ethyl ester | " | " |
| 6-Nitro-2-amino-(1,3)-benzthiazole | " | red violet |
| 4-Methoxy-6-chlor-2-amino-:(1,3)-benzthiazole | " | strongly bluish-tinged red |
| 4-Chloro-6-thiocyanate-2-amino-(1,3)-benzthiazole | " | bluish-tinged red |
| 2-Amino-(1,3)-benzthiazole | 3-[N-n-Butyl-N-(3'-sulphobenzyl)-amino]-toluene | red |
| 4-Chlor-2-amino-(1,3)-benzthiazole | " | bluish-tinged red |
| 6-Chlor-2-amino-(1,3)-benzthiazole | " | " |
| 2-Amino-(1,3)-benzthiazole-(6)-carboxylic acid ethyl ester | " | ruby |
| 2-Amino-(1,3)-benzthiazole | 3-[N-Ethyl-N-(3'-sulphobenzyl)-amino]-anisole | bluish-tinged red |
| 4-Chlor-2-amino-(1,3)-benzthiazole | " | strongly bluish-tinged red |
| 6-Chloro-2-amino-(1,3)-benzthiazole | " | " |
| 6-Thiocyanato-2-amino-(1,3)-benzthiazole | " | ruby |
| 2-Amino-(1,3)-benzthiazole-(6)-carboxylic acid dimethylamide | " | bluish-tinged claret |
| 2-Amino-(1,3)-benzthiazole-(6)-carboxylic acid ethyl ester | " | strongly bluish-tinged claret |
| 2-Amino-(1,3)-benzthiazole | 3-[N-Ethyl-N-(3'-sulphobenzyl)-amino]-chlorobenzene | red |
| 6-Chlor-2-amino-(1,3)-benzthiazole | " | bluish-tinged red |
| 6-Thiocyanato-2-amino-(1,3)-benzthiazole | " | strongly bluish-tinged red |
| 2-Amino-benzthiazole-(6)-carboxylic acid ethyl ester | " | ruby |
| 2-Amino-(1,3)-benzthiazole | 3-[N-Ethyl-N-(3'-sulphobenzyl)-amino]-acetanilide | bluish-tinged red |
| 6-Chlor-2-amino-(1,3)-benzthiazole | " | strongly bluish-tinged red |
| 2-Amino-(1,3)-benzthiazole-(6)-sulphonic acid dimethylamide | " | claret |
| 2-Amino-(1,3)-benzthiazole-(6)-carboxylic acid ethyl ester | " | bluish-tinged claret |
| 4,7-Dimethyl-2-amino-(1,3)-benzthiazole) | " | bluish-tinged red |
| 2-Amino-(1,3)-benzthiazole | 4-Acetylamino-2-[N-ethyl-N-(3'-sulphobenzyl)-amino]-anisole | red violet |
| 6-Chlor-2-amino-(1,3)-benzthiazole | " | reddish-tinged violet |
| 4,6-Dichlor-2-amino-(1,3)-benzthiazole | " | reddish-tinged violet |
| 4-Methyl-2-amino-(1,3)-benzthiazole | " | " |
| 4,7-Dimethyl-2-amino-(1,3)-benzthiazole | " | " |
| 6-Thiocyanato-2-amino-(1,3)-benzthiazole | " | violet |
| 2-Amino-(1,3)-benzthiazole-(6)-carboxylic acid ethyl ester | " | slightly reddish-tinged violet |
| 6-Methoxy-2-amino-(1,3)-benzthiazole | " | " |
| 6-Methylsulphonyl-2-amino-(1,3)-benzthiazole | " | " |

EXAMPLE 2

18.5 parts of 6-chlor-2-amino-(1,3)-benzthiazole in 100 parts of 85% strength orthophosphoric acid are diazotised with 30.4 parts of 41.8% strength nitrosylsulphuric acid according to the data in Example 1 and the diazonium salt solution is combined with an aqueous suspension of 31 parts of 3-[N-benzyl-N-(β-sulphoethyl)-amino]-toluene. After the usual working up, 47.3 parts of an azo dyestuff of constitution.

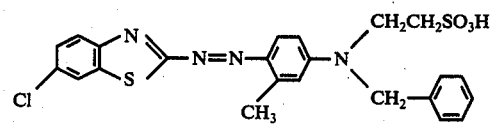

are obtained. This dyestuff dyes polyamide fibres or polyamide fabrics from a neutral dyebath or from a weakly acid dyebath in fast, clear, somewhat bluish-tinged red shades.

Further valuable dyestuffs are obtained if the diazo components and coupling components listed in the table which follows are combined with one another in the manner indicated in Example 1. The dyestuffs dye polyamide fibres in the shades indicated.

| Diazo Component | Coupling Component | Shade |
|---|---|---|
| 4-Chlor-2-amino-(1,3)-benzthiazole | 2-[N-(3-Sulphobenzyl)-amino]-toluene | bluish-tinged red |
| 6-Chlor-2-amino-(1,3)-benzthiazole | " | bluish-tinged red |
| 6-Methyl-2-amino-(1,3)-benzthiazole | " | red |
| 6-Thiocyanato-2-amino-(1,3)-benzthiazole | " | bluish-tinged red |
| 2-Amino-(1,3)-benzthiazole | 2-[N-(3-Sulphobenzyl)-amino]-anisole | red |
| 4-Chlor-2-amino-(1,3)-benzthiazole | " | bluish-tinged red |
| 6-Chlor-2-amino-(1,3)-benzthiazole | " | bluish-tinged red |
| 4,7-Dimethyl-2-amino-(1,3)-benzthiazole | " | red |
| 6-Thiocyanato-2-amino-(1,3)-benzthiazole | " | strongly bluish-tinged red |

Further valuable dyestuffs are obtained if the diazo components and coupling components of the table below are combined in accordance with the manner indicated in Example 1. The dyestuffs dye polyamide in the shades indicated.

| Diazo Component | Coupling Component | Shade |
|---|---|---|
| 2-Amino-(1,3)-benzthiazole | 3-[N-Benzyl-N-(β-sulphoethylamino)-toluene | yellowish-tinged red |
| 4-Chlor-2-amino-(1,3)-benzthiazole | " | bluish-tinged red |
| 4,6-Dichloro-2-amino-(1,3)-benzthiazole | " | bluish-tinged red |
| 4-Methyl-2-amino-(1,3)-benzthiazole | " | red |
| 4,7-Dimethyl-2-amino-(1,3)-benzthiazole | " | red |
| 6-Thiocyanato-2-amino-(1,3)-benzthiazole | " | strongly bluish-tinged red |
| 6-Nitro-2-amino-(1,3)-benzthiazole | " | ruby |
| 6-Methylsulphonyl-2-amino-(1,3)-benzthiazole | " | strongly bluish-tinged red |
| 2-Amino-(1,3)-benzthiazole-(6)-carboxylic acid ethyl ester | " | " |
| 2-Amino-(1,3)-benzthiazole-(6)-sulphonic acid dimethylamide | " | " |

EXAMPLE 3

150 parts of 2-amino-(1,3)-benzthiazole are diazotised in accordance with the data in Example 1 and coupled with 280 parts of 2-[N-(3'-sulphobenzyl)-amino]-toluene according to the data in Example 1. 428 parts of dyestuff of formula

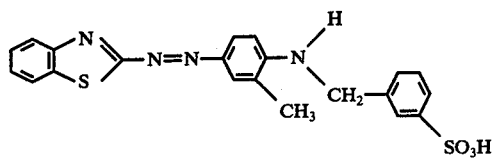

are obtained, which dyes polyamide fibres from neutral or weakly acid dyebaths in clear scarlet-coloured shades.

EXAMPLE 4

23 parts of 2-amino-(1,3)-benzthiazole-(6)-sulphonic acid in 85% strength orthophosphoric acid are diazotised with nitrosylsulphuric acid analogously to the data in Example 1 and coupled with 21.5 parts of N-ethyl-N-benzyl-aniline. 42.4 parts of the dyestuff of formula

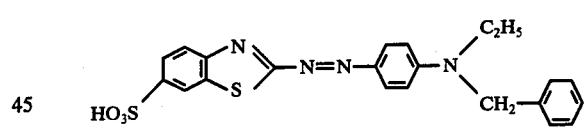

are obtained. This dyestuff dyes polyamide fibres from neutral or weakly acid dyebaths in clear red shades.

Further valuable dyestuffs are obtained if, in this example, the coupling components of the table below are used in place of N-ethyl-N-benzyl-aniline. The dyestuffs manufactured in this way dye polyamide fibres in the shades indicated.

| Diazo Component | Coupling Component | Shade |
|---|---|---|
| as in Example 4 | N-n-Butyl-N-benzyl-aniline | red |
| " | 3-(N-Methyl-N-benzyl-amino)-toluene | bluish-tinged red |
| " | 3-(N-Ethyl-N-benzyl-amino)-toluene | strongly bluish-tinged red |
| " | 3-(N-n-Butyl-N-benzyl-amino)-toluene | strongly bluish-tinged red |
| " | 3-(N-Ethyl-N-benzyl-amino)-chlorobenzene | bluish-tinged red |
| " | 3-(N-Ethyl-N-benzyl-amino)-acetanilide | strongly bluish-tinged red |
| " | 3-(N-Ethyl-N-benzyl-amino)-anisole | strongly bluish-tinged red |
| " | 2-(N-Benzyl-amino)-toluene | red |
| " | 2-(N-Benzyl-amino)-anisole | bluish-tinged red |
| " | 4-Acetylamino-2-(N-ethyl-N-benzyl-amino)-anisole | violet |
| " | 3-(N-Benzyl-amino)-acetanilide | bluish-tinged red |
| " | 4-Acetylamino-2-(N-benzyl-amino)-anisole | violet |

Further valuable dyestuffs are obtained if the diazo components and coupling components of the table

We claim:

1. Azo dyestuff of the formula

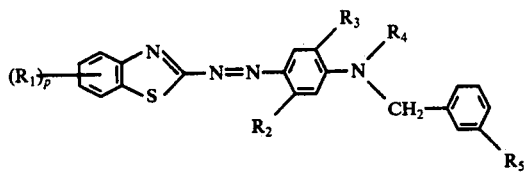

wherein
R$_1$ denotes hydrogen, C$_1$-C$_4$ alkyl, Cl, Br, —OCH$_3$, —OC$_2$H$_5$, —NO$_2$, —CN, —SCN, —SO$_2$CH$_3$, —SO$_2$C$_2$H$_5$, —SO$_3$H or —SO$_2$NX$_2$ with X being H or C$_m$H$_{2m+1}$ and m representing a number from 1 to 4, or R$_1$ represents —COOC$_n$H$_{2n+1}$, with n representing a number from 0 to 4, R$_2$ represents hydrogen, —CH$_3$, —C$_2$H$_5$, —OCH$_3$, —OC$_2$H$_5$, Cl, Br or —NHCOC$_n$H$_{2n+1}$, with n representing a number from 0 to 4, R$_3$ denotes hydrogen or —OCH$_3$, —OC$_2$H$_5$, CH$_3$ or C$_2$H$_5$, R$_4$ represents C$_n$H$_{2n+1}$, with n representing a number from 0 to 4, or R$_4$ represents —CH$_2$CH$_2$—SO$_3$H, R$_5$ represents hydrogen or sulphonic acid and p is 1 or 2, with the proviso that the dyestuff contains only one sulphonic acid radical and one of R$_1$, R$_4$ and R$_5$ represents or contains the said sulphonic acid radical.

* * * * *